United States Patent
Varone et al.

(10) Patent No.: US 8,453,927 B2
(45) Date of Patent: Jun. 4, 2013

(54) COMMUNICATION METHOD BETWEEN A HANDSET DEVICE AND IC CARDS

(75) Inventors: Francesco Varone, Bellona (IT); Amedeo Veneroso, Caserta (IT)

(73) Assignee: Incard SA, Geneva (CH)

( * ) Notice: Subject to any disclaimer, the term of this patent is extended or adjusted under 35 U.S.C. 154(b) by 327 days.

(21) Appl. No.: 12/439,222

(22) PCT Filed: Aug. 24, 2007

(86) PCT No.: PCT/EP2007/007438
§ 371 (c)(1), (2), (4) Date: Nov. 19, 2009

(87) PCT Pub. No.: WO2008/025485
PCT Pub. Date: Mar. 6, 2008

(65) Prior Publication Data
US 2010/0090000 A1    Apr. 15, 2010

(30) Foreign Application Priority Data
Aug. 31, 2006  (EP) .................................... 06018181

(51) Int. Cl.
*G06K 5/00*    (2006.01)

(52) U.S. Cl.
USPC .......................................... 235/382; 235/380

(58) Field of Classification Search
USPC ............... 235/382, 380, 462.45, 462.46, 472
See application file for complete search history.

(56) References Cited

U.S. PATENT DOCUMENTS

| | | | |
|---|---|---|---|
| 2006/0085848 A1 | 4/2006 | Aissi et al. | 726/9 |
| 2008/0010675 A1* | 1/2008 | Massascusa et al. | 726/9 |
| 2008/0212971 A1* | 9/2008 | Shaanan et al. | 398/130 |
| 2009/0046677 A1* | 2/2009 | Toledano et al. | 370/338 |

FOREIGN PATENT DOCUMENTS

| | | |
|---|---|---|
| EP | 1075155 | 2/2001 |
| WO | 2005/104584 | 11/2005 |
| WO | 2006/056220 | 6/2006 |

OTHER PUBLICATIONS

Anonymous, "Bluetooth enabled Sim-Card," Research Disclosure, Mason Publications, Hampshire, GB, Nov. 2000, 2 pages.

* cited by examiner

*Primary Examiner* — Daniel St. Cyr
(74) *Attorney, Agent, or Firm* — Allen, Dyer, Doppelt, Milbrath & Gilchrist, P.A.

(57) ABSTRACT

A communication method is between a handset device having a slot hosting a first IC card, and a second IC card. The method uses a plurality of commands based on a handset device-IC card interface and intended to drive a communication between the first IC card and the handset device. The method may include providing a second device, including a slot for hosting the second IC card, providing the first IC card and the second IC card with a wireless personal interface supporting a wireless communication, and inserting the second IC card inside the slot. A communication between the handset device and the second IC card is driven by forwarding a command received by the first IC card on the handset device/IC card interface to the wireless personal interface.

20 Claims, 5 Drawing Sheets

| SIM 1 | | SIM 2 | | REASON |
|---|---|---|---|---|
| AMADEO | 6345 | AMEX | 6345 | SAME NUMBER |
| MARINA | +39082312 (INTL) | MARI | 082312 | SAME NUMBER (EXCEPT INTERNATIONAL CODE) |
| SOFIA | 6447 | SOFIA | 6447 | SAME NUMBER AND NAME |

FIG. 7B

| VIRTUAL PAGE 1 PHONEBOOK FILE (ADN) ||
|---|---|
| AMADEO | 6345 |
| FRANCESCO | 6346 |
| MIRKO | 6465 |
| MARINA | +39082312 (INTL) |
| MICHELA | 082344 |
| GUIDO | 6342 |
| SOFIA | 6447 |
| AGOSTINO | 6321 |
| FREE | |
| FREE | |
| USED 8 FREE 2 TOTAL 10 ||

| VIRTUAL PAGE 2 PHONEBOOK FILE (ADN) ||
|---|---|
| ROSARIO | 6450 |
| ENZA | 082345 |
| HOME | 082396 |
| AMADEO | 6345 |
| FRANCESCO | 6346 |
| MIRKO | 6465 |
| MARINA | +39082312 (INTL) |
| MICHELA | 082344 |
| FREE | |
| FREE | |
| USED 6 FREE 2 TOTAL 10 ||

COMMUNICATION METHOD BETWEEN A HANDSET DEVICE AND IC CARDS

FIELD OF THE INVENTION

The present invention relates to the field of a communication method between a handset device, comprising a slot for hosting a first integrated circuit (IC) card and another IC card. More particularly, the method uses a plurality of commands, based on a handset device-IC card interface, intended to drive a first IC card hosted inside the slot.

BACKGROUND OF THE INVENTION

As is known, some handset devices, such as, mobile phones, personal digital assistants, and smart phones, comprise a slot intended to host an IC card or a flash memory card. For example, a mobile phone includes a slot for a Universal Subscriber Identity Module (USIM) associated to a subscriber line and to a corresponding phone number.

Figure 1:
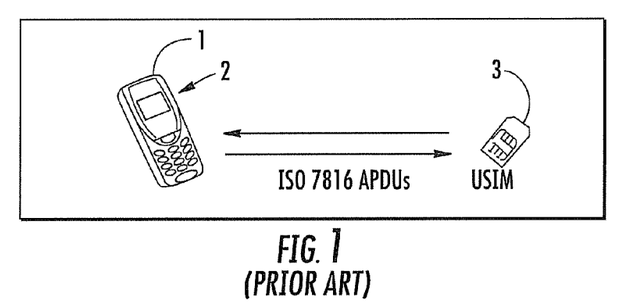
FIG. 1 schematically shows a handset device intended to host and communicate with a USIM, according to the prior art.

With reference to FIG. 1, a mobile phone schematically shown and indicated with numeral reference 1 comprises a slot 2 intended to host an IC card 3. A communication method between the mobile phone 1 and the IC card 3 is based on a standard communication protocol (ISO 7816) comprising a set of command Application Protocol Data Units (APDUs).

Sometimes, it is useful for a single user to have more than one USIM, each corresponding to a different phone number, generally associated to a different subscriber line.

For example, a first USIM is used for professional purposes and a second USIM is used for personal purposes, for foreign travels, for saving money with a cheaper rate, for accessing a network operator with different network coverage, or for using additional SIM Toolkit applications. It is also useful to have separated USIMs in order to distinguish different phonebooks and short message service (SMS) databases.

A communication method typically allows use of a single IC card at a time. In fact, according to such a communication method, a user may end a communication with a first IC card, in order to begin a communication with a second IC card, comprising the steps of: switching off the handset device, opening its cover, extracting the first IC card, substituting it with a second IC card, switching on the handset device, and establishing a communication with the second IC card.

More particularly, the slot inside the handset device is closed inside a handset cover, generally under a battery pack so that it is usually helpful to remove the handset cover and the battery pack to replace the IC card hosted in the slot. In this case, a user that needs to replace the IC card is involved in a laborious action.

It is also known that some handset devices, now neglected, were designed to host more than one IC card, generally in the back of the battery pack, in order to avoid an exchange as described above. Such a handset device was cumbersome because more than one IC card uses a lot of space inside the handset device in order to be hosted, the resulting size of the handset device being unsuitable to be carried in a the user's pocket.

Moreover, in such handset devices, a communication method between the IC card and the handset device provides that only one IC card at a time could be active, the operation of switching to the alternate IC card (usually done by powering the handset device off and on) may be an uncomfortable action. For this reason, new phone models that were smaller in size but not providing sufficient room for the battery and multiple IC cards replaced such a handset device.

SUMMARY OF THE INVENTION

An object of the present invention is to provide a communication method between a handset device and one or more IC cards without introducing more than one IC card inside the handset device. Further, an additional object is to limit the size of the handset device, and to provide a quick switching of a communication between the handset device and the one or more IC cards.

An object of the present invention is to provide a communication method achievable without modifying the hardware specification of the handset devices as well as a hardware specification of the IC cards.

For example, one embodiment relates to a method for implementing a wireless personal communication protocol between an IC card and a reader device, the IC card being hosted-in and in communication with a handset through a corresponding handset-IC card communication protocol. The method provides at least a phase for detecting and processing data associated to a wireless personal communication between the IC card and the reader device. The phase of detecting and processing data may be initiated after the processing of an APDU command sent by the handset to the IC card according to the handset-IC card communication protocol.

Another embodiment relates to a method for implementing a wireless personal communication protocol between an IC card and a reader device. The IC card is being hosted-in and in communication with a handset through a corresponding handset-IC card communication protocol. The method includes the following steps: the handset transmitting an APDU command to the IC card according to the handset-IC card communication protocol; the IC card detecting an association between the APDU command and an applet, stored inside the IC card; the IC card executing the APDU command; the IC card executing the applet, if an association between the APDU command and the applet is detected; and the IC card detecting data associated to a wireless personal communication with the reader device, the phase of detecting data being executed after the processing of the APDU command.

One embodiment relates to a communication method between a handset device, comprising a slot for hosting an IC card, and at least an IC card. The method includes providing insertion, inside the slot, of a first IC card for communicating with the handset device according to a handset device-IC card interface and providing insertion, for example, inside an additional box external to the handset device, of one or more additional IC cards, such additional IC cards being in communication with the first IC card through a wireless personal interface. When the handset device sends a command to the first IC card, the first IC card forwards such command, through the wireless personal interface, to an additional IC cards, hosted in the additional box and selected by the user among the one or more additional IC cards.

Another embodiment relates to a communication method between a handset device and a first IC card, hosted in a slot of the handset device, comprising a handset device-IC card interface intended to drive a communication between the first IC card and the handset device through a plurality of commands. The method includes the following steps: providing a portable hosting device comprising at least one slot hosting at least one second IC card; providing the first IC card and the at least one second IC card with a wireless personal interface;

supporting a wireless personal communication protocol between the first IC card and the at least one second IC card; and forwarding a command of the plurality of commands from the handset device-IC card interface to the wireless personal interface for driving, from the handset device, the at least one second IC card.

Further characteristics and the advantages of the communication method according to the present invention may be apparent from the following description of an embodiment thereof, made with reference to the annexed drawings, given for indicative and non-limiting purpose.

DETAILED DESCRIPTION OF THE PREFERRED EMBODIMENTS

Figure 2:
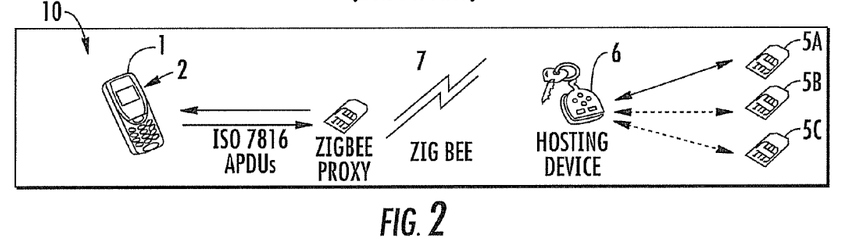
FIG. 2 schematically shows a handset device intended to host and communicate with USIM, according to the present invention.

According to the present invention and with reference to the annexed drawings, a communication method between a handset device and at least an IC card is schematically indicated with numeral reference 10. With reference to FIG. 2, the handset device 1 comprises a slot 2 for hosting a first IC card, a communication between the handset device 1 and the first IC card being based on a handset device-IC card interface, for example, an ISO 7816 protocol.

According to one embodiment of the disclosed method, a communication between the handset device 1 and at least a second IC card is provided. The first IC card 4 is inserted in typical way inside the slot 2 of the handset device 1 and it is in communication with it according to the handset device-IC card interface.

At least a second IC card is inserted inside an additional box 6, for example, external to the handset device 1, comprising at least one slot for hosting the corresponding at least one second IC card. In the example of FIG. 2, the at least one second IC card is illustratively represented with three IC cards 5a, 5b, 5c, without limiting the scope of protection to the number of IC card hosted by the additional box 6. The connection between the IC cards 5a, 5b, 5c and the additional box 6 is realized in a typical way, for example, they are hosted inside three corresponding slots, under an hardware point of view, similar to the slot 2 provided by the handset device 1.

According to one embodiment, the first IC card 4, the second IC cards 5a, 5b, 5c and/or the additional box 6 are provided with a wireless personal interface, supporting a corresponding wireless personal communication. Without limiting the scope of this disclosure, the additional box 6 may be external to the handset device 1 or it may be placed in an apposite location reached inside or nearby a cover of the handset device 1, substantially without wired connection with an electronic component of the handset device 1 itself.

According to one embodiment, data exchanged between the first IC card 4 and the handset device 1, based on a typical handset-IC card interface, is forwarded onto a wireless personal interface, to one of the IC card 5a, 5b, 5c hosted in the additional device 6.

The first IC card 4 and the at least a second IC cards 5a, 5b, 5c are provided with the wireless personal interface 7, supporting the wireless communication between the first IC card 4 and the additional one or more IC cards 5a, 5b, 5c. For example, the wireless personal interface 7 is supported by the additional box 6, while the at least second IC cards 5a, 5b, 5c is connected in typical way to the additional box 6.

According to the method, the first IC card 4 receives from the handset device 1a command by the typical handset device/IC card interface and forwards it to the at least second IC cards 5a, 5b, 5c through the wireless personal interface 7.

Hardware modifications to the handset device 1 are not used since the first IC card 4 has the same size and shape of a typical IC card, for example, the same size and shape of a typical USIM. Also, software modification to the typical handset device/IC card interface is not used since the method may not involve change of the communication between the handset device 1 and the first IC card 4. The first IC card 4 may have a same form factor than a standard IC card intended to be physically inserted in the slot of the handset device 1.

Figure 3:
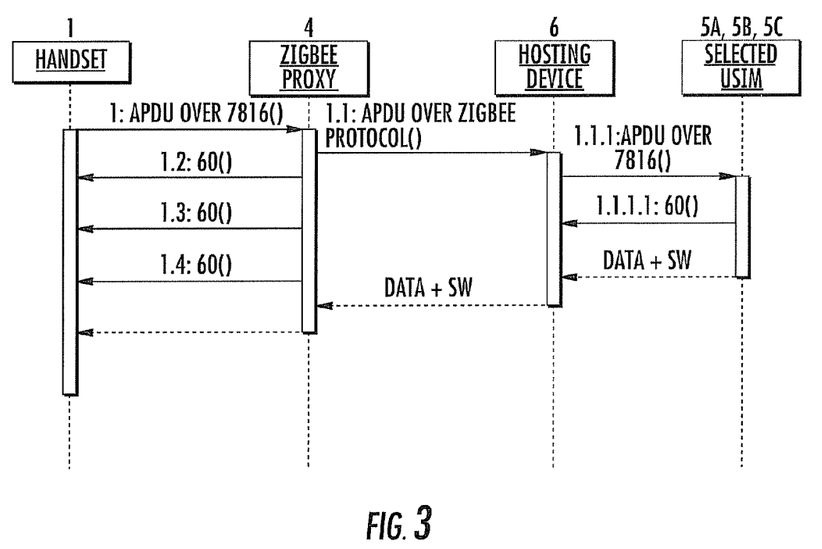
FIG. 3 schematically shows, in a block diagram, a communication between a handset device and a USIM, according to the present invention.

More particularly, the first IC card 4 has no subscription line but it works like a proxy replicating an ISO 7816 communication between the handset device 1 and the first IC card 4 on the wireless personal interface 7. A communication between the handset device 1 and the first IC card 4, as well as a wireless communication between the first IC card 4 and the at least second IC card 5a, 5b, 5c, according to the method is schematically represented in FIG. 3. The steps labeled with the code 60 denote the standard way used in IC cards to instruct handsets or other terminals that the IC card is working. In typical systems, these steps are needed to keep communication alive even if response is not ready yet and to avoid the handset aborting communication due long waiting time. In FIG. 3, it is shown how this procedure can be used to compensate the longer response time due to wireless communication overhead.

Without limiting the scope of the present disclosure, a ZigBee communication protocol is considered to better explain the wireless personal communication between the first IC card 4 and the second IC cards 5a, 5b, 5c. A ZigBee communication protocol is indicated for implementing a wireless communication in an IC card, due to its low hardware use and low power consumption. A different wireless personal communication protocol could be taken in consideration without altering the scope of the present disclosure.

More particularly, the ZigBee is a specification for a high level communication protocol based on small, low-power digital radios, complying to the IEEE 802.15.4 standard. The IEEE 802.15 is the 15th working group of the IEEE 802, specialized in standards relating to Wireless Personal Area Network. More particularly, the fourth section of such working groups IEEE 802.15.4, identified as Low Rate Wireless Personal Area Network (WPAN) section, deals with low data rates and very long battery life.

A communication protocol according to the ZigBee specification is, for example, implemented for industrial, scientific and medical radio bands, corresponding to 868 MHz in Europe, 915 MHz in the USA, and 2.4 GHz in most locales worldwide. A network based on such communication protocol is intended to be simpler and cheaper than other WPAN, such as, Bluetooth. As a comparison, the most capable device implementing communication protocol based on ZigBee specification, hereinafter ZigBee node, uses only about 10% of the software of a typical Bluetooth or Wireless Internet device, and the simplest ZigBee nodes are about 2%.

More particularly, there are three different types of ZigBee device: ZigBee coordinator (ZC), the most capable device intended to coordinate, it represents a root of a network tree and might bridge to other networks. There is exactly one ZigBee coordinator in each network, able to store information about the network, including acting as the repository for security keys. The second type is a ZigBee Router (ZR), acts as an intermediate router, passing data from other devices. The third type is a ZigBee End Device (ZED), contains just enough functionality to talk to its parent node, either the coordinator or a router. It cannot relay data from other devices. It uses the least amount of memory, and therefore may be less expensive to manufacture than the above mentioned ZR or ZC.

It is out not significant to establish which, among the second IC cards 5a, 5b, 5c, the first IC card 4 and the additional box 6 is the master of the wireless communication and which is the coordinator, the router or the end-point because this is a choice of implementation, not altering the idea of the communication method.

Again with reference to FIG. 3, the handset device 1 sends an ISO 7816 compliant APDU command to the first IC card 4, according to the typical handset-IC card interface. Such first IC card 4 forwards the ADDU command to the additional box 6, through the wireless personal interface 7. The additional box 6 receives the APDU command through the wireless personal interface 7 and forwards it to the at least second IC card 5a, 5b, 5c, for example according to ISO 7816 standard protocol.

When the second IC card 5a, 5b, 5c processes the received APDU command, it sends back a response to the additional box 6. The additional box 6 returns the response to the first IC card 4, through the wireless personal interface 7. According to the method, a mapping phase is provided in order to transform an APDU command according to the typical handset-IC card interface into a corresponding APDU command according to the wireless personal interface, for example, according to a ZigBee protocol.

More particularly, the method provides splitting of a typical APDU command before sending it to the wireless personal interface. In fact, in some wireless personal protocols, like ZigBee protocol, a packet of data has a size smaller than the maximum data size according to the typical handset-IC card interface, for example, the ISO 7816 maximum data size is 256 bytes, greater than a packet size in the ZigBee protocol. Similarly, the communication method provides reassembly of the APDUs, previously subdivided, in order to render it readable to the second IC cards 5a, 5b, 5c, like a typical APDU command.

Figure 4:
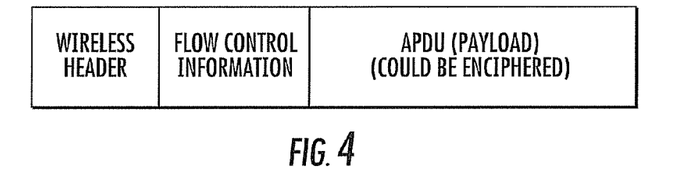
FIG. 4 schematically shows a packet of data in wireless communication between IC cards, according to the present invention.

FIG. 4 schematically shows a packet of data for a wireless communication between the handset device 1 and the second IC cards 5a, 5b, 5c. The packet of data comprises a wireless header block, for examples storing information about the destination of the packet, a flow control information block, for splitting and/or reassembling one or more long APDUs, and an APDU block, storing the APDU command.

Since a radio protocol is usually broadcast over the air, it can be easily monitored by an unauthorized and hidden receiver. For this reason, the method provides a phase for rendering secure the communication between the first IC card 4 and the additional box 6, as well as the communication between such additional box 6 and the at least second IC card.

In fact, a potential attack could, for example, try to observe data stored inside the second IC card 5a, 5b, 5c by intercepting data sent by such second IC card 5a, 5b, 5c to the additional box 6 or data sent from such additional box 6 to the first IC card 4. More particularly, the method provides an encrypting (ciphering) of a transmission through a typical cryptographic algorithm based on a key exchange. During an administrative phase under the control of a user, a secret key is exchanged, for example, between the first IC card 4 and the additional box 6 and herein registered.

The communication method provides that during the administrative phase intended to exchange the secure key, the wireless personal interface is excluded but the first IC card 4 is inserted inside the slot present in the additional box 6 in order to prevent an unauthorized IC card from getting registered to the additional box 6.

The secure keys may, for example, be stored by a manufacturer inside two ZigBee devices, i.e. one first IC card 4 and one additional box 6, the ZigBee devices sharing the same secure keys. In this case they could be used together, for example, the additional box 6 and the first IC card 4 could be sold together. In this case, the additional box 6 cannot be ever used in combination with a first IC card different from the one it was sold with.

Another approach is the following. One of the two ZigBee devices is provided with a master key. For example, let the additional box 6 hold the master key. The master key is shared inserting the IC card 4 in the additional box 6, in one of the slots dedicated to the second IC card 5a, 5b, 5c, so to transmit the master key over the wired interface. In this case, a given additional box 6 can be used with whatever piece of the first IC card, provided that it has been previously inserted in the additional box 6 to perform the administrative phase.

It is also preferable that a mechanism is used to make void a previous key exchange, to avoid that a first IC card, lost or given to another user, can be used to spy on the wireless communication between the additional box 6 and the new replacement first IC card. Making void a previous key exchange can be achieved by simply discarding the old key held by the additional box 6 and generating a new one during each administrative phase. In this case, the new first IC card may be provided with the new key, while the key held by the old IC card is no longer recognized by the additional box 6. Also an explicit procedure to cancel key received by IC card during a previous administrative phase could be performed for inserting the first IC card in one of the slots present in the additional box 6 and pressing a button. According to the communication method, many other security approaches may be adopted for protecting the wireless communication: for example a strong key exchange based on a Diffie-Hellmann algorithm or an authentication scheme based on an RSA asymmetric cryptography.

Figure 5:
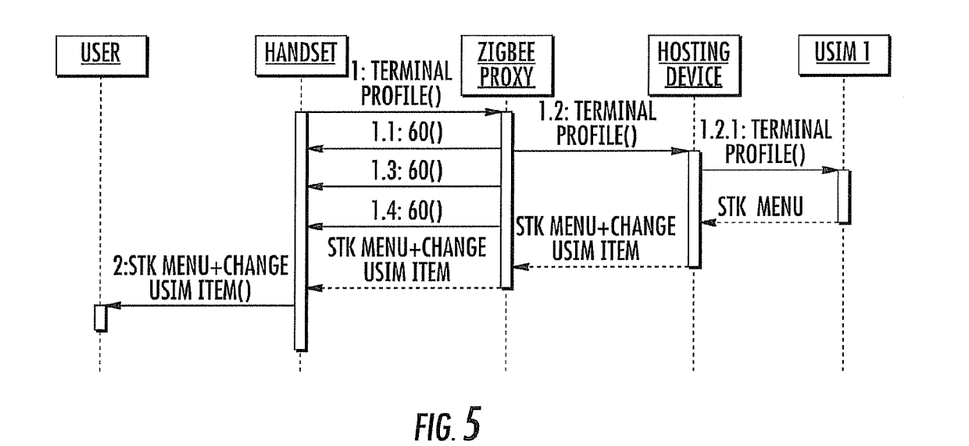
FIG. 5 schematically shows a sequence of steps executed for selecting one of at least one second IC card for a wireless communication, according to the present invention.

Being the handset device 1 designed to use a single IC card at a time, the communication method also provides a phase for selecting a specific IC card among the second IC cards 5a, 5b, 5c, inserted inside the additional box 6. The phase for selecting a specific IC card may allow a user to decide which subscriber line he desires to use, for example, through a graphic interface on a display of the handset device 1, driven by an application loaded inside the first IC card 4, for example, using SIM Application Toolkit commands defined in ETSI Technical Specification 11.14. The switching of a second IC card 5a, 5b, 5c, may also be managed through an application stored inside the handset device 1, adding an administrative menu for setting an active IC card 5a, 5b, 5c.

The administrative menu allows the user to query which IC card among the second IC cards 5a, 5b, 5c is available, for example, which IC card is inserted in the additional box 6. Once the one of the second IC cards is selected, the first IC card 4 issues a REFRESH proactive command, for example, according to the ETSI TS 11.14, to the handset device 1 for switching to the selected IC card 5a, 5b, 5c.

The administrative menu driven by the first IC card 4 can also present an option to make void the key possibly used to protect communication between the first IC card 4 and the additional box 6, so that the first IC card 4 may be submitted to a new key exchange with the same or another additional box 6 to return operative.

Figure 6:
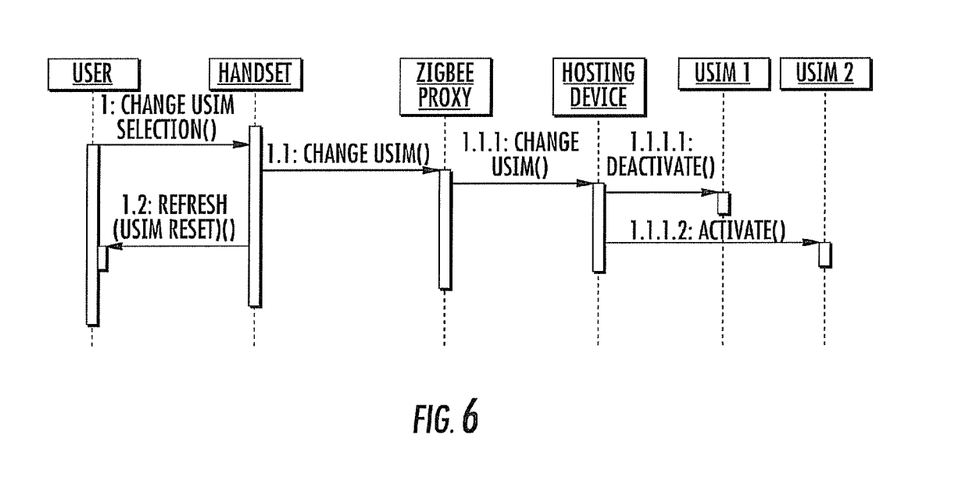
FIG. 6 schematically shows a sequence of steps executed for deactivating a current IC card and for activating a selected IC card for a wireless communication, according to the present invention.

Otherwise, the communication method may provide that, during the power on of the handset device, an IC card 5b is selected automatically, such IC card 5b being different, in a revolving way, from an IC card 5a selected during a previous power on of the handset device. A phonebook, a SMS database or personal information, stored inside a non-active second IC card, may be accessed from the additional box 6, even if only one of the at least second IC cards at a time is available for a telephone communication.

In fact, the handset device is designed to use a single IC card at a time, but this is limited to the files related to the subscriber line and to the commands provided by the IC card, not to the utility information unrelated to telecom operator and network authentication. As an example not limiting to scope of the present disclosure, a merging of a first address book, belonging to an IC card active for a telephone communication, with a second address book, belonging to an IC card non-active for a telephone communication, is briefly described.

While the active IC card is used for network authentication, the communication method retrieves phonebooks and SMS data from corresponding non-active IC card hosted inside the additional box 6. The communication method, organizes phonebooks and SMS data in order to present them to the handset device 1 as a single virtual phonebook and virtual SMS database.

For example, the communication method provides organization of the virtual SMS database as a merging of all the SMS data inside the second IC cards 5a, 5b, 5c. More particularly, in a GSM environment, the communication method may support a plurality of data file merging. For example, the set of SMS data files belonging to all the second IC cards 5a, 5b, 5c, wherein each SMS data file stored inside each second IC card comprises a plurality of records, is mapped into a single virtual SMS data file, comprising the merging of the plurality of records belonging to each SMS data file. Each record may have a fixed length, according to the standard specification ETSI TS 11.11.

Also, the set of phonebook data files belonging to all the second IC cards 5a, 5b, 5c, wherein each phonebook data file stored inside each second IC card comprises a plurality of records, may be mapped into a single virtual phonebook comprising the merging of the plurality of records belonging to each phonebook data file.

Since each second IC card 5a, 5b, 5c usually stores a number of records near to an upper limit, the communication method provides that the single virtual phonebook is not the mere union of all phonebook data files but a selection of significant data files. For example, empty and duplicate records among the IC cards are ignored.

If there are exceeding records even after the selection, such exceeding records may be ignored, since they belong to a non-active IC card. Otherwise, the communication method includes browsing the exceeding records in a plurality of phonebook pages, for example, through a browse command driven by the first IC card 4 using a graphic interface of the handset device.

Since the phonebook and SMS data file are usually cached by the handset device 1, the communication method provides that the browse command comprises a REFRESH command with "file refresh" option issued to force the handset device 1 to re-read a new version of the virtual phonebook data file. More particularly, the new version includes significant records, excluded by the previous loaded version of virtual phonebook data file. Iteratively, if there are exceeding records, a new page is available to substitute a last version.

Since it is not guaranteed that the record size in a first phonebook of an IC card of the second IC card is equal to the record size in a second phonebook of another IC card of the second IC card, the communication method provides that the virtual phonebook is based on record having the greater size between the record sizes. The communication method returns the file size and record size of the virtual data file.

Figure 7A:
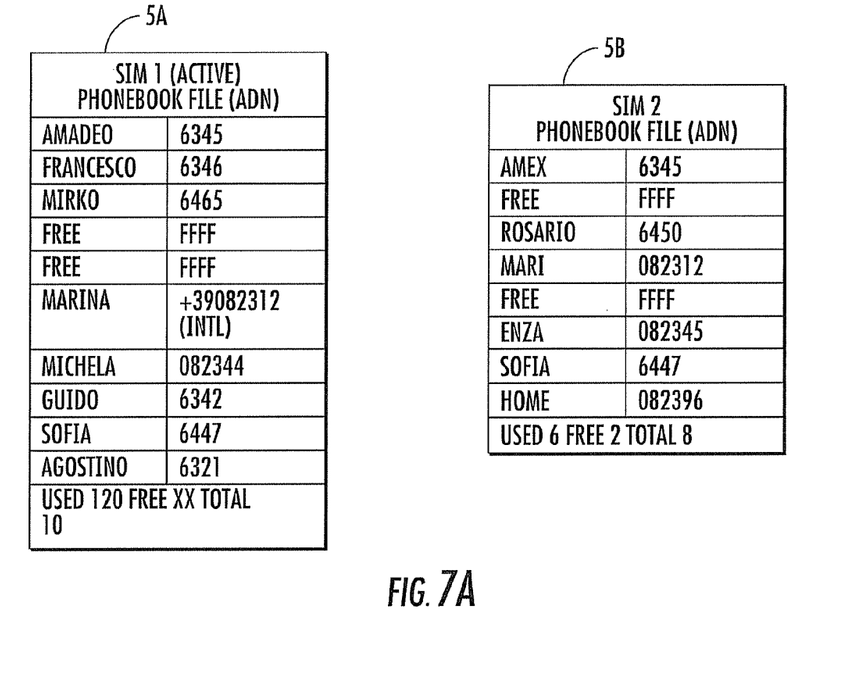
FIG. 7a schematically shows phonebook contents of two corresponding IC cards, according to the present invention.

With reference to FIG. 7a, it is schematically represented an IC card 5a storing a first phonebook data file comprising ten records and an IC card 5b storing a second phonebook data file comprising eight records. As schematically represented in FIG. 7c, the page 1 of the virtual phonebook comprises 10 records, supposed that, to simplify description, that 10 is the upper limit for number of records. Even if there are further contacts belonging to the second phonebook to be displayed, some free records are inserted inside the virtual phonebook, to allow a user to add new contacts. More particularly, if a new contact is inserted, it is flushed in the IC card 5a, that is the active one, if possible, otherwise in the first free record available in any IC card 5a, 5b.

The page 2 of the virtual phonebook contains all the significant contacts of the IC card 5b. Since there is remaining space in the virtual phonebook, being its size substantially greater than the size of the IC card 5b, some contacts belonging to the page 1 of the virtual phonebook are shown, as well as some free space for adding contacts. Which contact to be presented in each page, depends on a specific policy, for example, base on a priority of the entries and it is a matter if implementation.

Figure 7B:
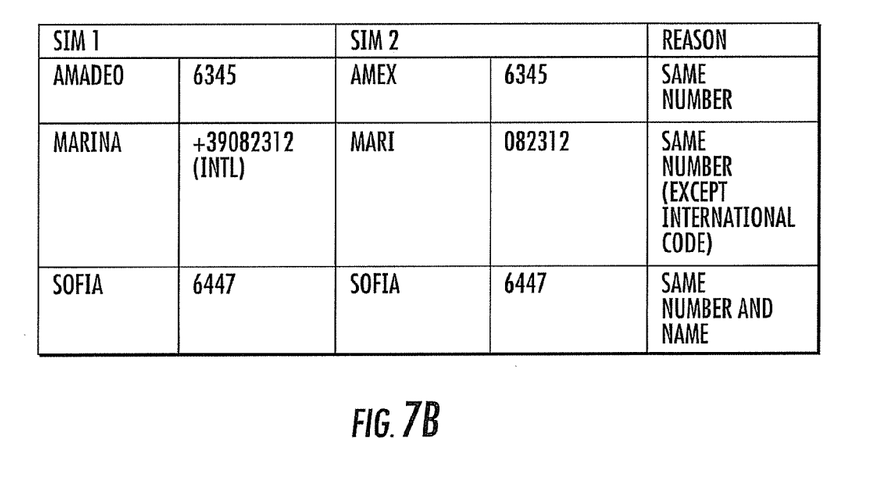
FIG. 7b schematically shows a selection of the phonebook contents of FIG. 7a in order to create a virtual phonebook content, according to the present invention.
Figure 7C:
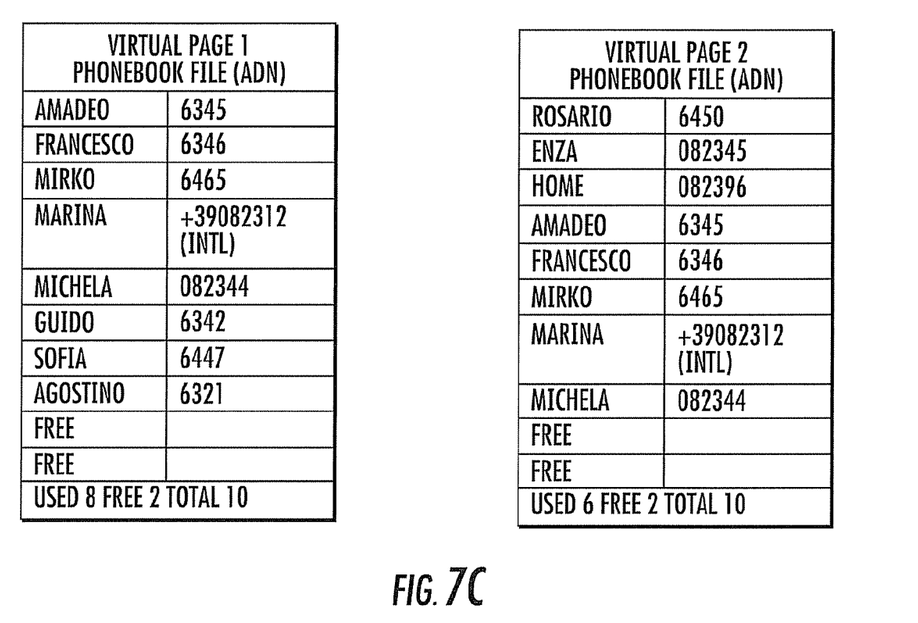
FIG. 7c schematically shows the virtual phonebook content structured in corresponding virtual pages, according to the present invention.

FIG. 7b schematically shows an example of a selection of the phonebook contents of FIG. 7a, in order to create a virtual phonebook content, according to the present disclosure. For example, assuming that a handset device updates the records of a phonebook using the first free record, a following policy may be considered: entries in the first records of a virtual phonebook data file are the most important, since they have been inserted by the user earlier; entries in the bottom of the file, are the most recent inserted and therefore that they may be recalled soon with high probability; and duplicated entries may appear once, but with an high priority.

The communication method provides a menu to a user in order to select which set of phonebook data files and SMS data files to use. The method according to the present disclosure also provides a multi PIN management of the second IC cards 5*a*, 5*b*, 5*c*. In fact, if multiple IC cards are accessed simultaneously, a corresponding PIN may be presented for each IC card. More particularly, each IC card is associated to a specific PINs but the handset device 1 usually asks the user for a single PIN to a single IC card.

Even if possible, by way of an application running on the first IC card 4 for PIN management at power on, it is uncomfortable for a user to enter many PINS every time the handset device 1 is turned on. The communication method supports a change PIN service intended to align multiple PIN values, associated to the at least one second IC card, in a single PIN value, for example, the PIN value of the active IC card.

For improving security, the communication method does not track the PIN value of the at least one second IC card, used to align all the PIN values but the serial number of such IC card, being not recommended to track a PIN value. For example, the IC card serial number is stored inside the additional box 6. If an IC card 5*b* results in a list of IC cards with the same PIN, the PIN first successfully entered for an active IC card 5*a* is presented also to the IC card 5*b*. If the PIN verification fails, the IC card 5*b* is removed from the list of IC cards with the same PIN, and the communication method changes PIN to the user.

Figure 8:
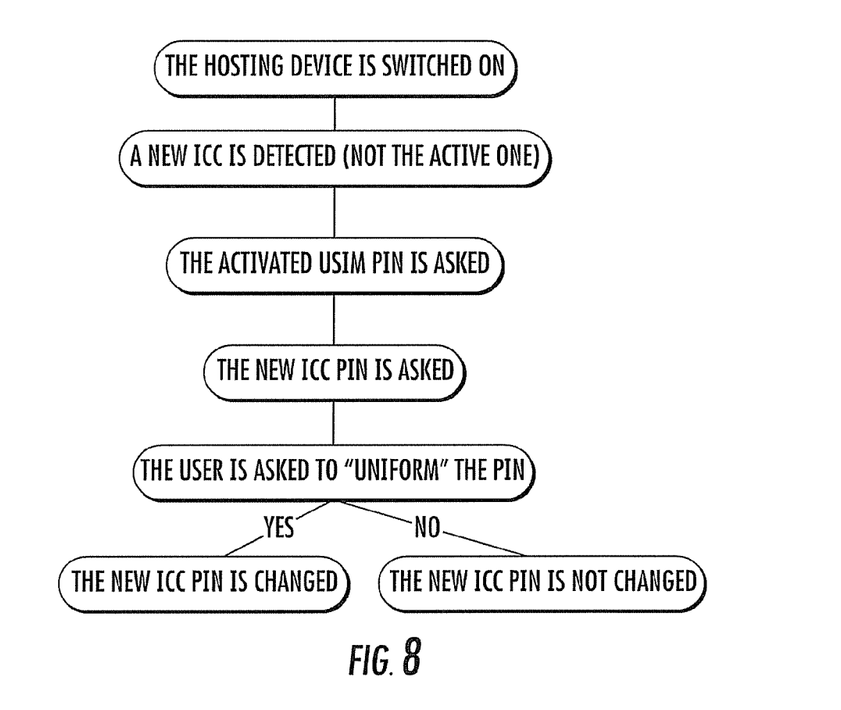
FIG. 8 schematically shows a possible PIN alignment between more than one IC card, according to the present invention.

The additional box cannot suppose that an IC card 5*b* has a same PIN of an active IC card 5*a* if such IC card 5*b* is not in the list, and should minimize the attempts to verify PIN on untracked IC cards, since after three consecutive unsuccessful PIN presentations, the card is blocked. A possible PIN alignment according to the communication method is schematically represented in FIG. 8.

Advantageously, the communication method provides an improved connectivity to external devices, for example, a connection between the additional box 6 and a personal computer based on a wireless personal communication like ZigBee, Bluetooth, or based on a wire connection like universal serial bus (USB). According to such improved connection, a personal computer may read phonebooks, SMS and similar contents stored inside the second IC cards, as well as participating to a test, sending a plurality of configuration command to the second IC cards, for example, during their manufacturing phase.

Figure 9:
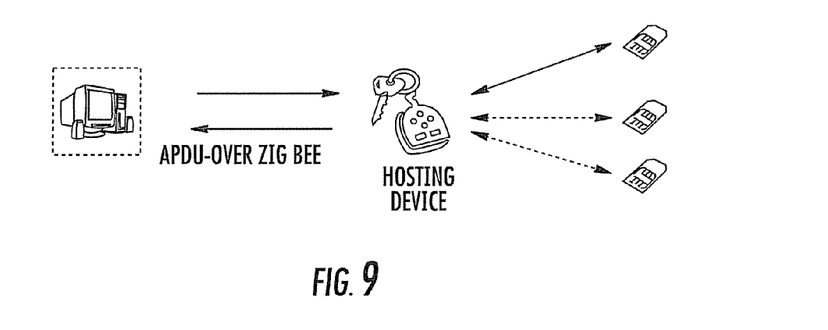
FIG. 9 schematically shows an interconnection between an additional box and a personal computer, according to the present invention.
Figure 10:
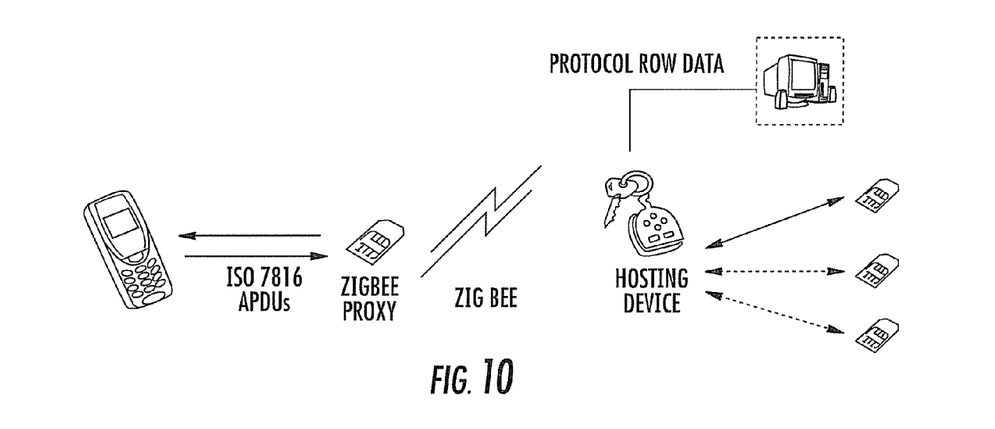
FIG. 10 schematically shows a couple of interconnections between an additional box and, respectively, a personal computer and a handset device, according to the present invention.

With reference to FIG. 9, the communication method provides that the additional box 6 is interconnected through a wireless personal interface with a personal computer. The additional box 6 sends and receives APDU commands over the wireless personal communication to/from the personal computer. With reference to FIG. 10, the communication method provides that the additional box 6 is interconnected both to a personal computer and a handset device 1.

According to a different embodiment, the additional box 6 provides one or more slots for hosting different purposes IC cards, for example, a USIM and a multimedia mass storage card such as MultiMediaCard (MMC). The additional box 6 communicates with the USIM through a typical handset-USIM interface while it communicates with the MMC according to a typical handset-MMC interface. At handset side, an IC card as the described first IC card 4 is inserted in the handset USIM slot, and the IC card replicates communication between the handset and the IC card on the wireless personal interface 7. Moreover a multimedia card is inserted in the handset multimedia slot. The multimedia card is not used to have any significant storage or other capabilities, but it is provided with wireless connectivity, as the first IC card 4, and it replicates communication (usually data exchange and file access) between the handset and the multimedia card on the wireless personal interface 7. In this way, multimedia card containing actual data is not directly inserted in the handset, but inserted in the additional box 6, with the same advantages as for IC cards.

Advantageously, this approach may also provide multi-format capabilities so that an SD card or other format may be used with a handset device provided only with a MMC slot if, for example, the additional box 6 is designed to accept secure digital (SD) format and handset MMC only Advantageously, an additional box 6 may be used with further multimedia memory slots for users that need many memory cards. For example, a main memory card reserved for the mobile phone and permanently inserted in the additional box 6, and another memory card, in use with the digital camera, inserted in the additional box 6 only when needed.

The communication methods manages the multiple slots in one of the following approaches: only one slot at a time may be active, being a selection made using the a menu in the handset device graphic interface; contents of two or more IC cards are managed, for example, merged in a single virtual data file, such a virtual data file looks like a directory of a single IC card comprising a plurality of sub-directories for each corresponding additional IC card.

Advantageously, the communication method allows use of a plurality of the first IC card, each one inserted in a corresponding handset device 1 and associated to a single additional box 6. If a first handset device 1 is not available, for example, because battery is charging, a second handset device 1 may be used without removing a first IC card 4 inserted in the first handset device 1.

Advantageously, the communication method supports multiple communications between a handset device and the at least one second IC card, such IC card being hosted in an additional box, external the handset device, in order to maintain the total size and the weight of the handset device, suitable to be hosted in a pocket. At the same time, the communication method provides a quick switching of a communication between the handset device and different IC cards, chosen by a user between the at least second IC cards.

The communication method is achievable without modifying the hardware specification of the handset devices as well as the hardware specification of the IC cards. Also the typical handset-IC card interface is not altered, being the first IC card driven by a set of standard APDU commands according to such typical handset-IC card interface. Also, the at least one second IC card may receive and answer to standard APDU command according to such typical handset-IC card interface, sent by the additional box.

Advantageously, considering the size of a USIMs, according to ISO 7816 plug-in or ETSI 3rd form factor and the characteristics of a radio protocol IEEE 802.15.4 and ZigBee protocol, for the provision of the corresponding power for the communication method, it is sufficient that the additional box 6 comprises a lithium button-sized battery or a small rechargeable battery, thus limiting its size and weight for user comfort That which is claimed:

1. A communications method between a handset device and a portable hosting device, the handset device including a first integrated circuit (IC) card hosted in a slot of the handset device, the first IC card using a handset device-IC card interface for communication between the first IC card and the handset device based upon a plurality of commands, the method comprising:
providing at least one second IC card hosted in at least one slot of the portable hosting device;
providing the first IC card and the at least one second IC card with a wireless interface and supporting a wireless communications protocol between the first IC card and the at least one second IC card; and
forwarding a command from the plurality of commands from the handset device-IC card interface to the wireless interface for interfacing with the at least one second IC card from the handset device.

2. The communications method according to claim 1 wherein the forwarding comprises:
splitting a packet of data including the command from the handset device-IC card interface into at least one split packet based upon the wireless interface;
sending the at least one split packet over the wireless communications protocol from the first IC card to the at least one second IC card;
reassembling the at least one split packet into a single packet including the command; and
sending the single packet over the wireless communications protocol from the at least one second IC card to the first IC card.

3. The communications method according to claim 2 further comprising:
exchanging a secure key between the at least one second IC card and the first IC card; and
encrypting/decrypting the at least one split packet based upon the secure key.

4. The communications method according to claim 2 wherein the at least one second IC card comprises a plurality thereof; and further comprising setting an active IC card among the plurality of second IC cards, the active card sending the single packet.

5. The communications method according to claim 4 wherein the setting is driven by a user interface on the handset device.

6. The communications method according to claim 4 further comprising generating a file including data stored in the active IC card and data stored in at least one non-active second IC card from the plurality of second IC cards, the handset device being able to access the file.

7. The communications method according to claim 6 wherein the file comprises data stored in the active IC card and data stored in the at least one non-active second IC card.

8. The communications method according to claim 4 further comprising aligning a value of a personal identification number (PIN) associated to one of the plurality of second IC cards to a value of a PIN associated to the active IC card.

9. The communications method according to claim 1 wherein the handset device-IC card interface comprises an ISO 7816 protocol.

10. The communications method according to claim 1 wherein the wireless interface protocol comprises a ZigBee communications protocol.

11. A communication system comprising:
a handset device having a first integrated circuit (IC) card hosted in a slot therein, the first IC card communicating with the handset device based upon a handset device-IC card interface and being based upon a plurality of commands; and
a portable hosting device including at least one slot hosting at least one second IC card;
said first IC card and the at least one second IC card supporting a wireless interface therebetween and forwarding a command from the plurality of commands from the handset device-IC card interface to the wireless interface for interfacing with the at least one second IC card from the handset device.

12. The communication system according to claim 11 further comprising:
a module for splitting a packet of data including the command in the handset device-IC card interface into at least one split packet based upon the wireless interface;
a module for sending the at least one split packet over the wireless communications protocol from the first IC card to the at least one second IC card; and
a module for reassembling the at least one split packet into a single packet including the command.

13. The communication system according to claim 11 further comprising:
a module for splitting a packet of data including the command in the handset device-IC card interface into at least one split packet according to the wireless interface;
a module for sending at least one packet over the wireless communications protocol from said at least one second IC card to the first IC card; and
a module for reassembling the at least one split packet into a single packet including the command.

14. A method for communicating between a mobile wireless communications device with a first Subscriber Identity Module (SIM) card hosted therein and a portable hosting device, the mobile wireless communications device using a device-SIM card interface for communication between the first SIM card and the mobile wireless communications device and being based upon a plurality of commands, the method comprising:
providing at least one second SIM card hosted in the portable device hosting;
providing the first SIM card and the at least one second SIM card with a wireless interface based upon a wireless communications protocol between the first SIM card and the at least one second SIM card; and
forwarding a command from the plurality of commands from the device-SIM card interface to the wireless interface for interfacing with the at least one second SIM card from the mobile wireless communications device.

15. The method according to claim 14 wherein the forwarding comprises:
splitting a packet of data including the command from the device-SIM card interface into at least one split packet based upon the wireless interface;
sending the at least one split packet over the wireless communications protocol from the first SIM card to the at least one second SIM card;
reassembling the at least one split packet into a single packet including the command; and
sending the single packet over the wireless communications protocol from the at least one second SIM card to the first SIM card.

16. The method according to claim 15 further comprising:
exchanging a secure key between the at least one second SIM card and the first SIM card; and
encrypting/decrypting the at least one split packet based upon the secure key.

17. The method according to claim 15 wherein the at least one second SIM card comprises a plurality thereof; and further comprising setting an active SIM card among the plurality of second SIM cards, the active card sending the single packet.

18. The method according to claim 17 wherein the setting is driven by a user interface on the mobile wireless communications device.

19. The method according to claim 17 further comprising generating a file including data stored in the active SIM card and data stored in at least one non-active second SIM card from the plurality of second SIM cards, the mobile wireless communications device being able to access the file.

20. The method according to claim 19 wherein the file comprises data stored in the active SIM card and data stored in the at least one non-active second SIM card.

* * * * *